US006238069B1

(12) United States Patent
Miles

(10) Patent No.: US 6,238,069 B1
(45) Date of Patent: May 29, 2001

(54) LIGHT BRACKET ASSEMBLY FOR MECHANICS CREEPERS

(75) Inventor: Joseph J. Miles, Plant City, FL (US)

(73) Assignee: United Auto Systems, Inc., Tampa, FL (US)

( * ) Notice: Subject to any disclaimer, the term of this patent is extended or adjusted under 35 U.S.C. 154(b) by 0 days.

(21) Appl. No.: 09/324,416

(22) Filed: Jun. 2, 1999

(51) Int. Cl.[7] ................................ B60Q 1/00; B60Q 3/00

(52) U.S. Cl. .......................... 362/486; 362/220; 362/225; 280/32.6

(58) Field of Search ................................. 280/32.6, 32.5; 362/486, 220, 225

(56) References Cited

U.S. PATENT DOCUMENTS

| | | | |
|---|---|---|---|
| D. 353,058 | 12/1994 | Dallas | D6/336 |
| D. 365,935 | 1/1996 | Dallas | D6/336 |
| D. 406,432 | 3/1999 | Taylor et al. | D34/23 |
| D. 406,683 | 3/1999 | Taylor et al. | D34/23 |
| 4,232,357 | 11/1980 | Dietz | 362/61 |
| 4,698,731 | * 10/1987 | Johns, Sr. | 362/486 |
| 4,986,558 | 1/1991 | Morris | 280/32.6 |
| 5,174,592 | * 12/1992 | Pool | 280/32.6 |
| 5,392,201 | 2/1995 | Morley et al. | 362/61 |
| 5,730,449 | 3/1998 | Miles | 280/32.6 |

OTHER PUBLICATIONS

P&B Mfg. Co. brochure entitled “Power View 1”, 1993.*

P&B Mfg. Co. brochure entitled “P & B presents the World’s Next Generation Creeper! Ultimax” 1994.*

1993 P&B Mfg. Co. brochure entitled “Power View I”, 1993.

Whiteside Manufacturing Co. Inc. Catalog No. 89 entitled “Rolll–Over Creepers and Other Related Products”, No Publication Date.

1994 P&P Mfg. Co. brochure entitled “P & B Presents the World’s Next Generation Creeper! Ultimax”, 1994.

* cited by examiner

*Primary Examiner*—Sandra O’Shea
*Assistant Examiner*—Ali Alavi
(74) *Attorney, Agent, or Firm*—Holland & Knight LLP

(57) ABSTRACT

A light bracket assembly for connection to a mechanics creeper having opposing side members between which is positioned a bed and a headrest, the light bracket assembly including at least one light bracket with an attachment portion for attachment to the creeper and a cradle portion for cradling a mechanic’s light, whereby a mechanic’s light may be cradled within the cradle portion of the light bracket for illuminating a work area.

17 Claims, 16 Drawing Sheets

LIGHT BRACKET ASSEMBLY FOR MECHANICS CREEPERS

BACKGROUND OF THE INVENTION

1. Field of the Invention

This invention relates to mechanics creepers. More particularly, this invention relates to mechanics creepers including a mechanics light for illuminating a working area underneath a vehicle.

2. Description of the Background Art

Presently, there exist many types of mechanics lights for illuminating the working area of the mechanic. Mechanics lights may comprise a traditional "drop light" whereas other types of mechanics lights are integrated with mechanics seats or creepers.

More particularly, as illustrated in U.S. Pat. No. 4,232,357, a work-illuminating electric lamp is disclosed as being supported by an upright support of a conventional mechanics seat. Casters on the bottom of the mechanics seat allow the mechanics seat to be rolled around the periphery of the vehicle being worked on and the upstanding electric lamp optimally illuminates the work area from above and behind the mechanic's head.

U.S. Pat. Nos. 4,698,731, 4,986,558 and 5,392,201 disclose various types of lights that are attached to or otherwise integrated with creepers. For example, in U.S. Pat. No. 4,698,731, the light is integrated at the head portion of the mechanics creeper so as to optimally illuminate the underside of the vehicle from above the mechanic's head who is laying in a prone position on the mechanics creeper. U.S. Pat. 4,986,558 discloses paired, battery-operated lights which are mounted on an attachment to a mechanics creeper at opposing sides of the head portion of the mechanics creeper. The disclosures of each of the above-referenced patents are hereby incorporated by reference herein.

Unfortunately, it should be readily apparent that the above-described lights for mechanics creepers and seats suffer from the disadvantage of requiring structural changes to the mechanics creeper or seat or otherwise requiring complicated methods for connecting the light to the mechanics creeper or seat. Moreover, the above-described mechanics lights generally require specially configured designs that can be incorporated into the mechanics creepers or seats as disclosed.

In view of the foregoing, there presently exists a need for a light bracket assembly for an "off-the-shelf" light that can be easily incorporated into a mechanics creeper without structural changes to the creeper itself. In this manner, the light bracket assembly may be easily retrofitted to existing designs of mechanics creepers as well as for sale in the aftermarket for retrofitting to existing mechanics creepers in wide use by mechanics.

Therefore, it is an object of this invention to provide an improvement which overcomes the aforementioned inadequacies of the prior art devices and provides an improvement which is a significant contribution to the advancement of the mechanics creeper art.

Another object of this invention is to provide an integrated mechanics creeper and light which optimally provides illumination from above and behind the mechanic's head while in a prone position on the mechanics creeper underneath a vehicle.

Another object of this invention is to provide a bracket assembly for mechanics lights that may be easily connected to existing designs of mechanics creepers.

Another object of this invention is to provide a light bracket assembly that may be easily connected to existing designs of mechanics creepers to allow conventional, off-the-shelf mechanics lights to be used in connection with a mechanics creeper to provide light from above and behind the mechanic's head.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a light bracket assembly for connection to a conventional mechanics creeper allowing a conventional, off-the-shelf mechanics light to be stored in the bracket assembly so as to provide illumination from behind and above the mechanic's head while working underneath a vehicle.

More particularly, the bracket assembly of the invention comprises a frame member that is configured and dimensioned to connect to the ends of the opposing side frame members of the mechanics creeper at the head portion of the creeper. The assembly further comprises a pair of light brackets that are designed to snap onto opposing sides of the frame member in facing relationship so as to define a cradle for supporting the off-the-shelf mechanics light at the head of the creeper. The light brackets may alternatively be snapped to one of the side frame members of the creeper in facing relationship so as to define a cradle for supporting the off-the-shelf mechanics light at the side of the creeper.

Preferably, the light brackets include an attachment portion and a cradle portion. The attachment portion includes a cross-sectional configuration generally corresponding to the cross-sectional configuration of the frame member so as to be easily snap-fitted thereon without necessarily the need for fasteners such as bolts or rivets. The cradle portion preferably comprises a cross-sectional configuration that is generally non-circular such that when the mechanics light is cradled therein, the mechanics light is precluded from rolling therein. In this manner, the mechanics light may be cradled between the light brackets with its incandescent or fluorescent light illuminating upwardly above and behind the mechanic's head. The non-circular cross-sectional configuration of the respective cradle portions precludes longitudinal rotation of the light as it is being cradled. Moreover, since the mechanics light is merely being cradled in the light bracket, the mechanic may easily lift the light out of the cradle and use it as a conventional drop light.

The frame member is preferably connected to the ends of the side frame members of the mechanics creeper by forming at least the ends of the frame member of a tubular material and press-fitting the ends of the frame member over the ends of the side frames of the mechanics creeper. In this manner, no structural changes are required to be made to the mechanics creeper. The light bracket assembly of the invention may therefore be easily retrofitted to existing designs of mechanics creepers.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
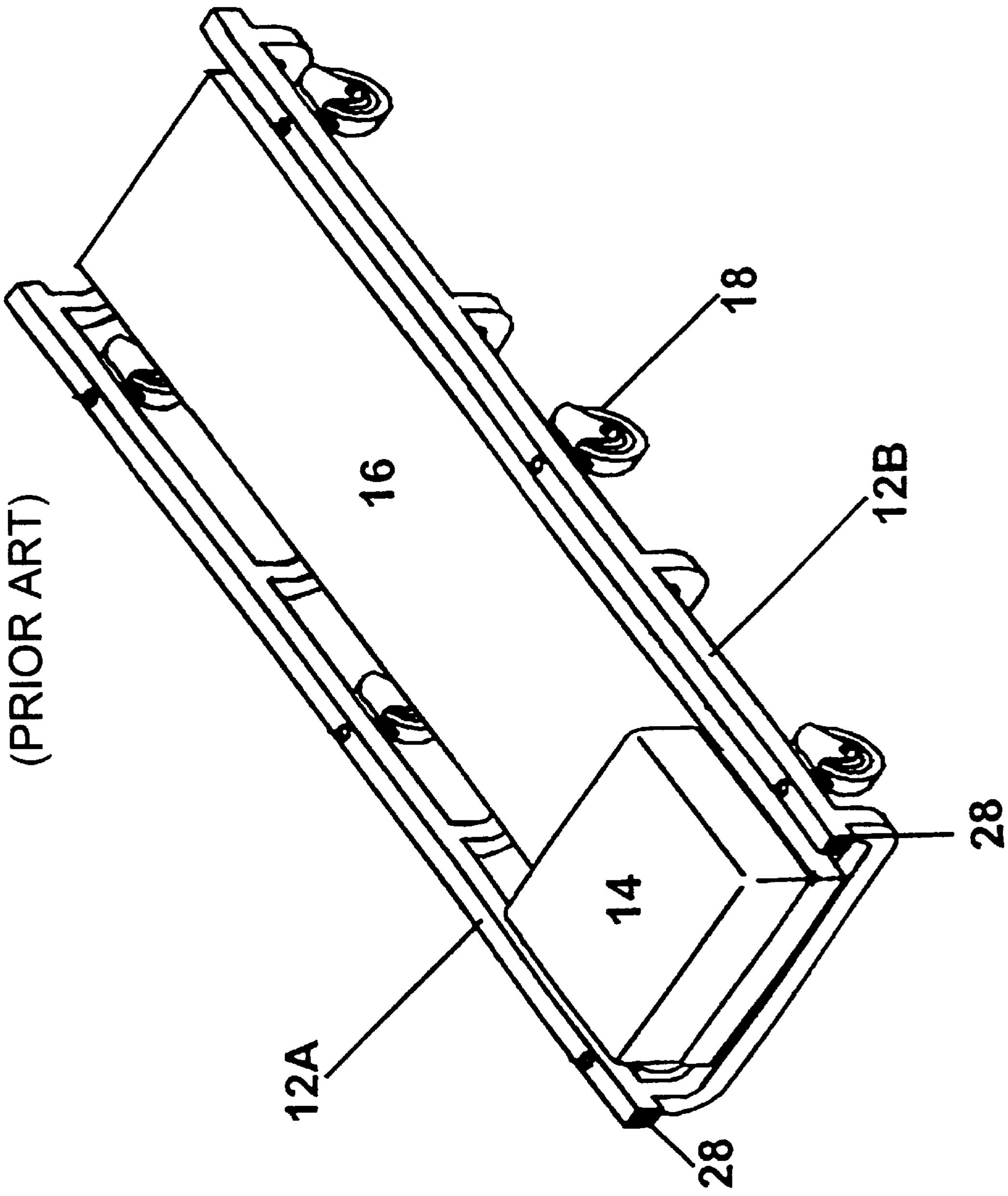
Fig1 (PRIOR ART)
FIG. 1 is a perspective view of a prior art creeper illustrating the opposing side frame members, the caster wheels, and the headrest and bed of the creeper.

As shown in FIG. 1, conventional prior art creepers 10 generally comprise a pair of opposing side frame members 12A and 12B, between which is supported a headrest 14 and bed 16. Creepers 10 generally include a plurality of caster wheels 18. During use, a mechanic may lay on the bed 16 with his or her head resting on the headrest 14 and conveniently roll under a vehicle (not shown) to work thereon.

Figure 2A:
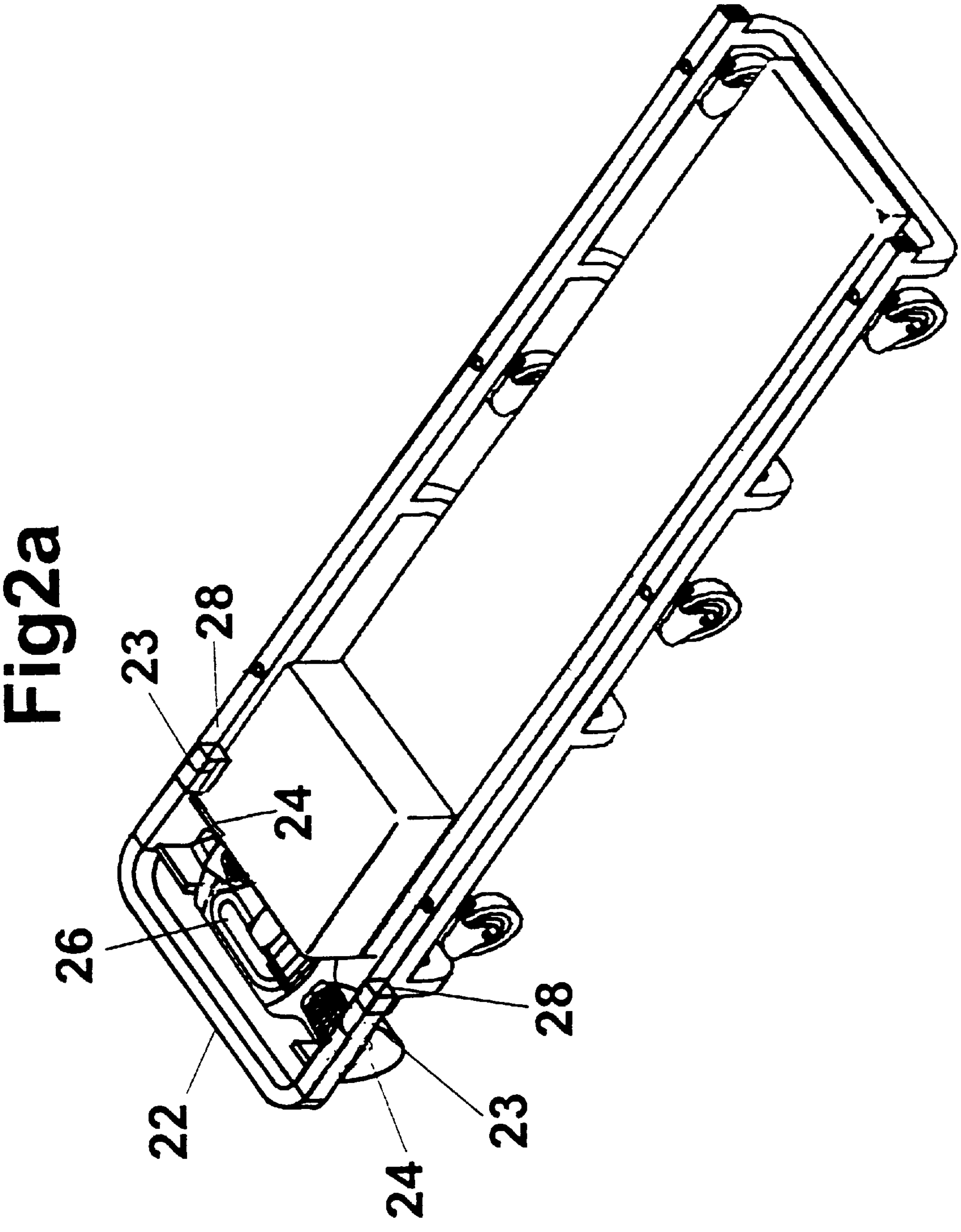
FIG. 2A is a perspective view of the light bracket assembly of the invention illustrating the frame member and the light brackets thereof, and illustrating, in phantom, the manner in which the ends of the frame member are press fitted onto the ends of the opposing side frame members of a prior art creeper.
Figure 2B:
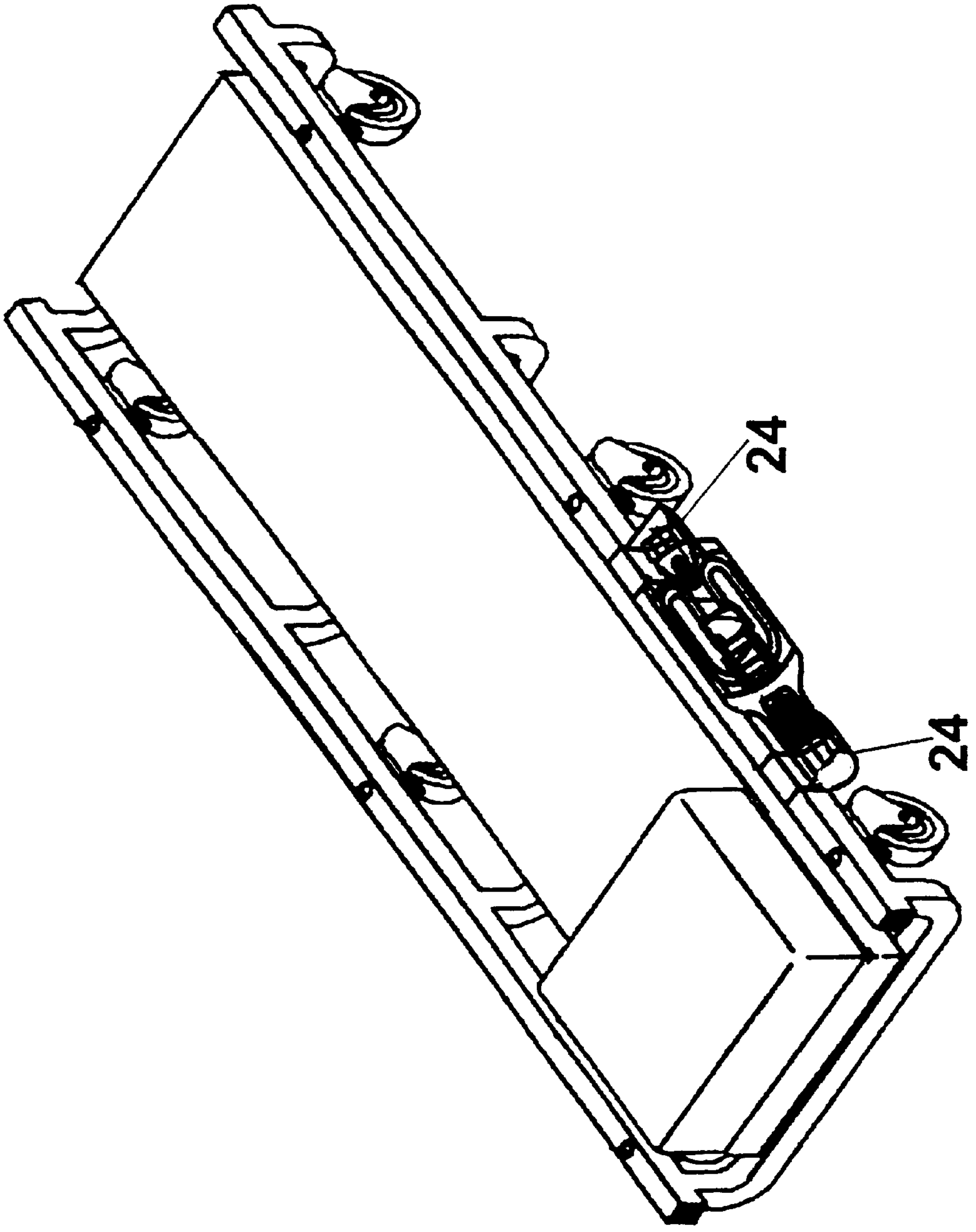
FIG. 2B is a perspective view of a pair of light brackets of the invention mounted on the side frame member of the creeper in facing relationship.

The invention comprises a light bracket assembly 20 comprising a frame member 22 and two embodiments of a pair of light brackets 24 which are connected either to the member 22 or to one of the side members 12A or 12B of the creeper 12 in facing relationship (see FIGS. 2A and 2B, respectively).

Referring now to FIG. 2A, as shown in phantom, the ends 23 of the frame member 22 are tubular and are designed to be press-fitted onto the corresponding ends 28 of the side members 12A and 12B of the mechanics creeper 10. Further, as also shown in phantom, a conventional mechanics light 26 may be cradled within the first embodiment of the light brackets 24 so as to provide illumination from above and behind a mechanic's head. Referring to FIG. 2B, the second embodiment of the light brackets 24 may be connected to one of the side members 12A or 12B of the creeper 12 so as to provide illumination to the side of the mechanic.

Figure 3A:
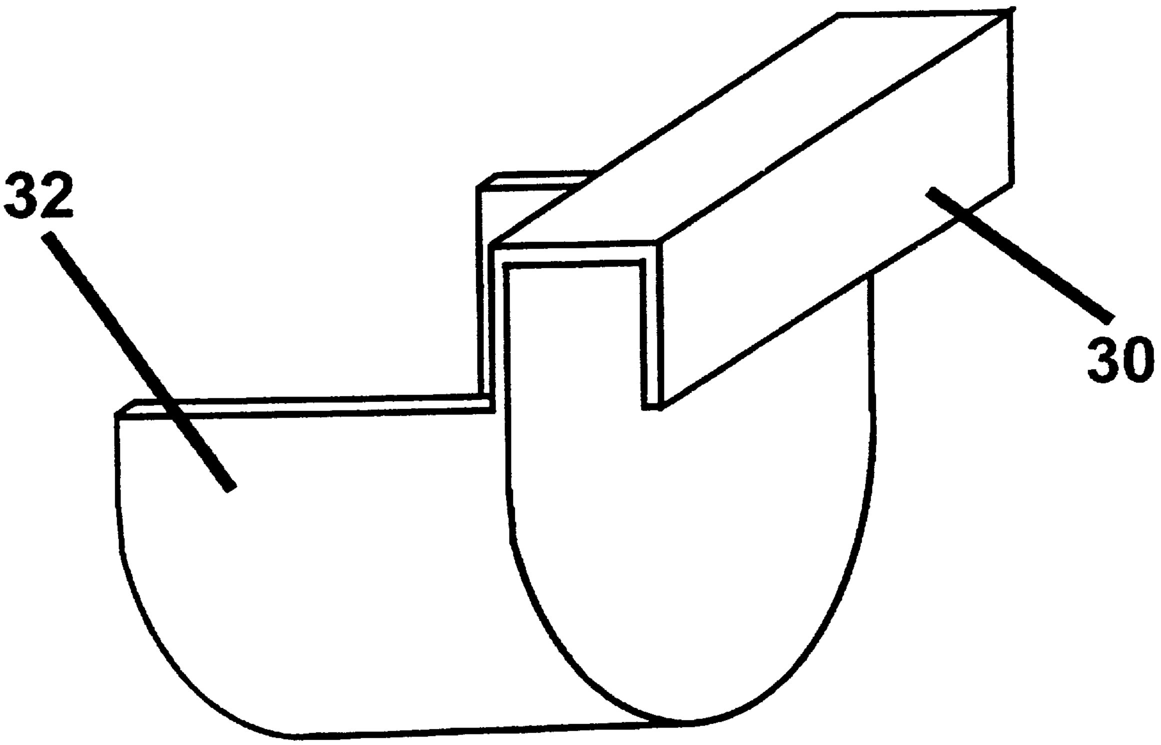
FIG. 3A is a perspective view of one embodiment of the light bracket.
Figure 3B:
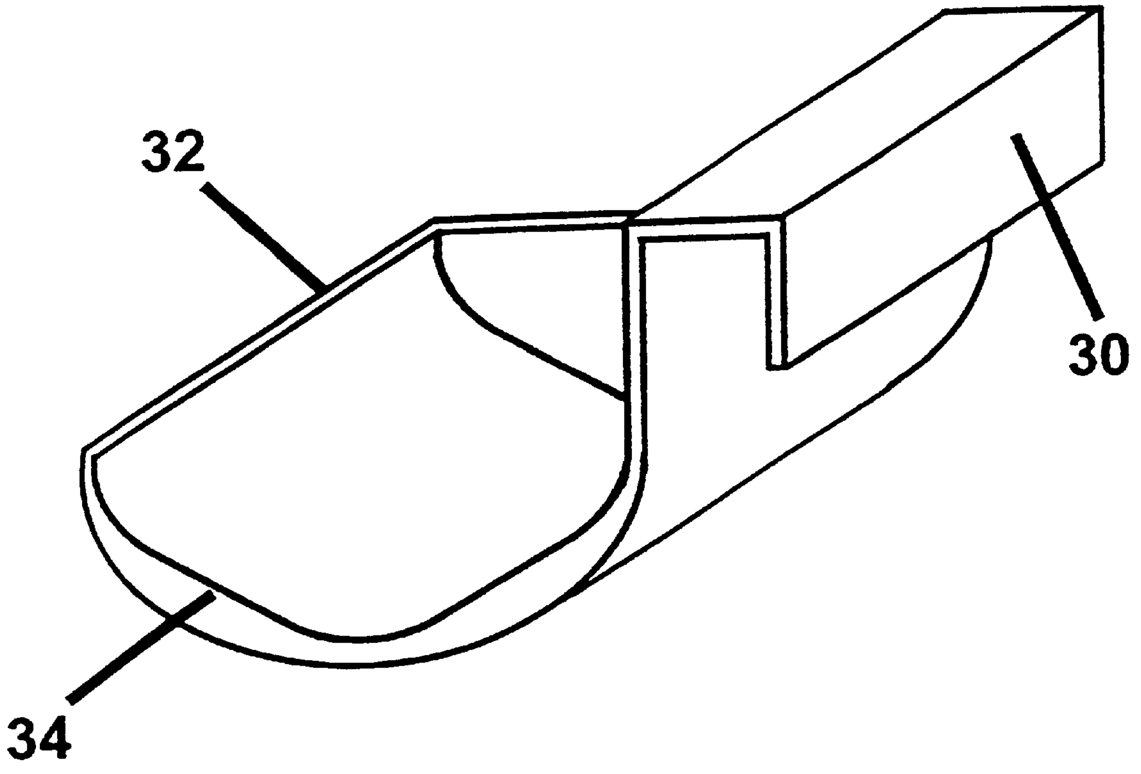
FIG. 3B is a perspective view of another embodiment of the light bracket.

As shown in FIGS. 3A and 3B, both embodiments of each light bracket 24 comprises an attachment portion 30 for attaching to the frame member 22 and a cradle portion 32 in which the mechanic's light 26 is to be cradled. In the first embodiment, the axis of the cradle portion 32 is positioned parallel to the axis of the attachment portion 30 whereas in the second embodiment, the axes are perpendicular.

Figure 4:
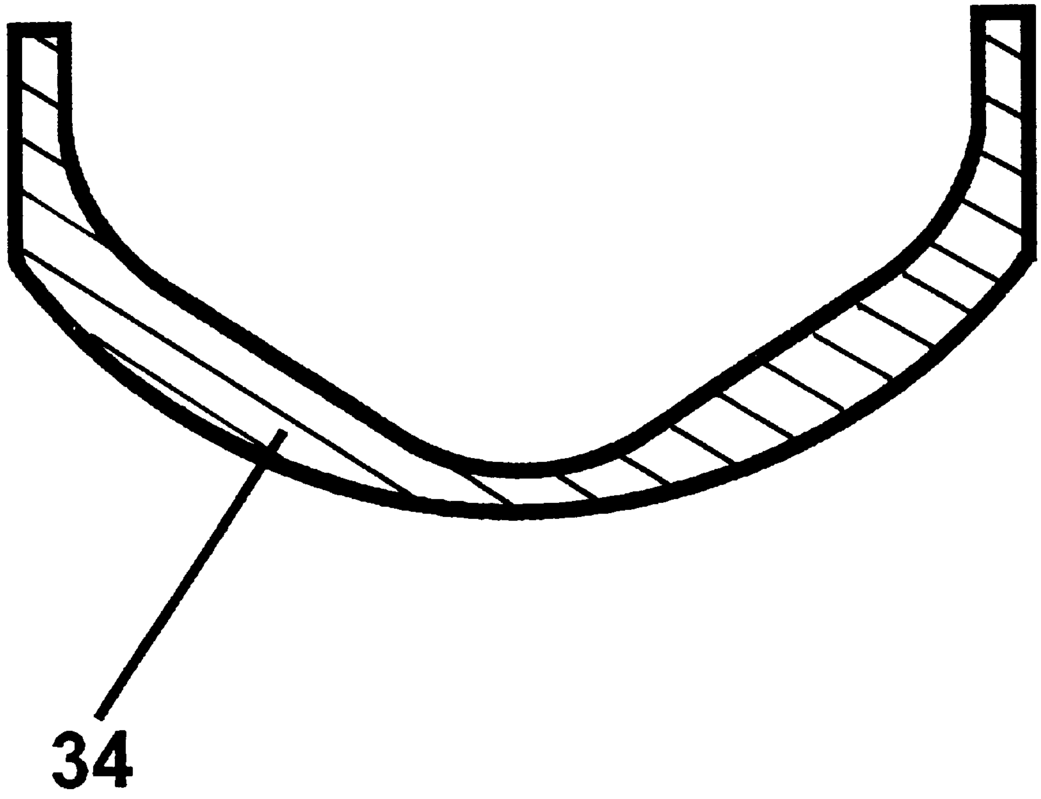
FIG. 4 is a cross-sectional view of the light bracket along lines 4—4 of FIGS. 3A and 3B, illustrating the cross-sectional configuration of the cradle portion thereof.
Figure 5A:
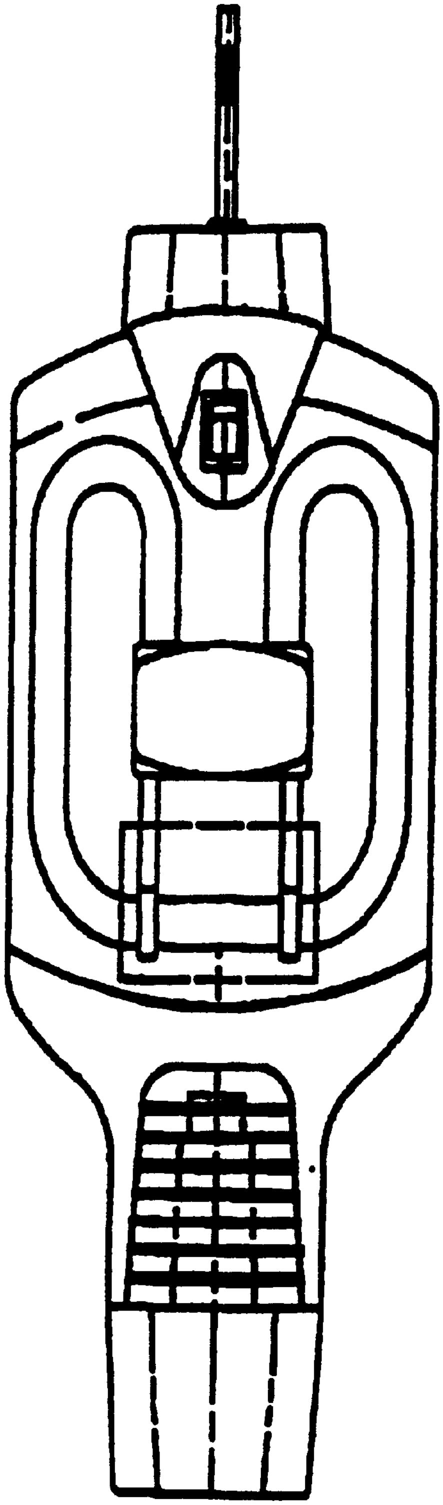
Fig5a (PRIOR ART)
FIG. 5A is a plan view of a mechanic's drop light that may be used in conjunction with the light bracket assembly of the invention by being supported between opposing cradle portions of the light brackets thereof.
Figure 5B:
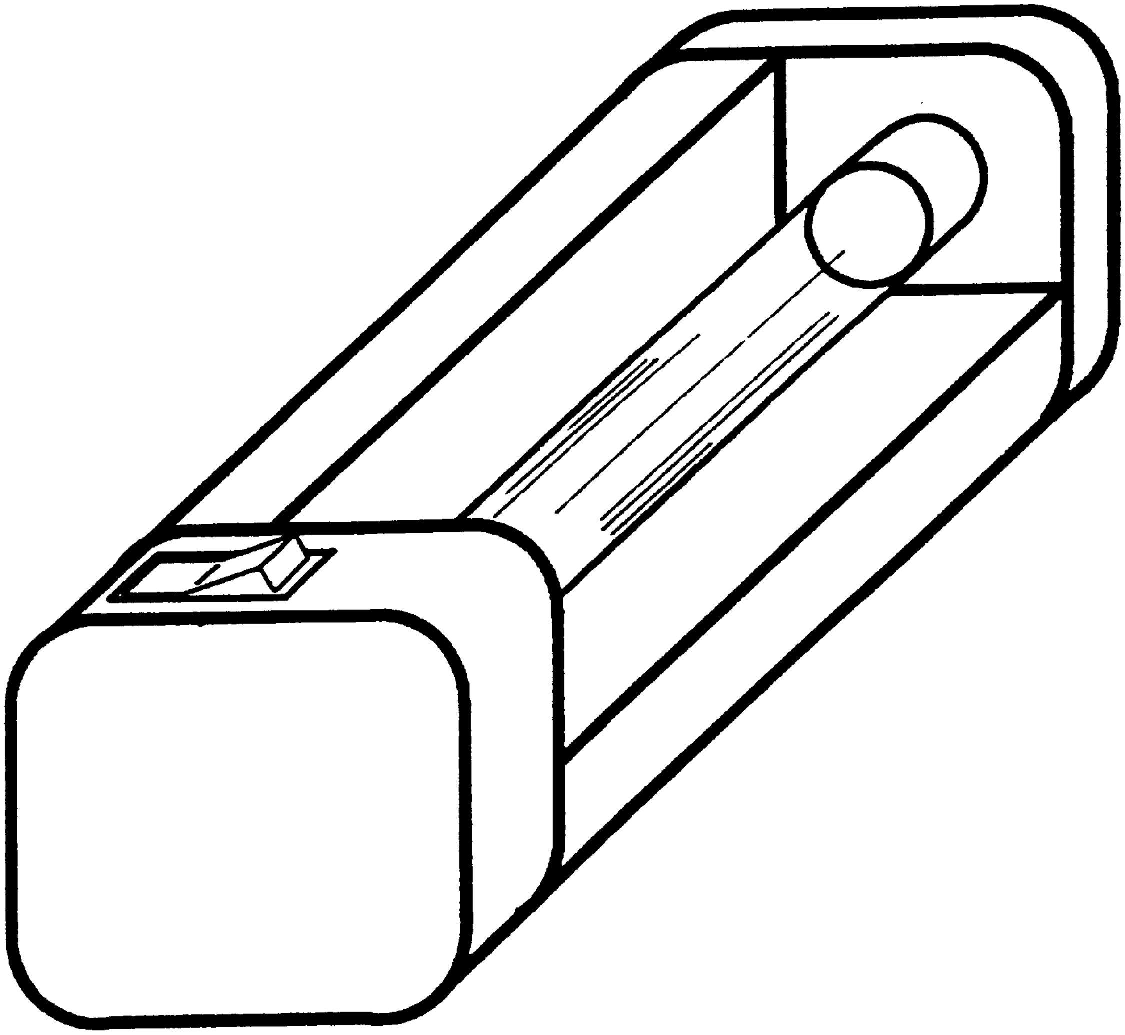
Fig5b (PRIOR ART)
FIG. 5B is a perspective view of another type of drop light that may be used in connection with the light bracket assembly of the invention.

Referring now to FIG. 4, the cradle portion 32 of the light bracket 24 preferably includes a generally non-semi-circular interior configuration 34, such as a generally V-shaped configuration. The purpose of such non-semicircular configuration 34 is to prelude rolling of the light 26 in the cradle portion 32. More specifically, as shown in FIGS. 5A and 5B, a conventional drop light 26 usually has an outer surface that is non-semi-circular in configuration which can best serve as a means for orienting the drop light 26 while being cradled within the light bracket 24, such that the illumination provided thereby may be oriented upwardly so as to shine upwardly from behind the mechanic's head in the desired direction. The non-semi-circular configuration 34 of the cradle portion 32 of the light bracket 24 thus serves as a means to orient the light's 26 illumination in the desired direction. Of course, the non semi-circular configuration may comprise any other desired configuration such as square, rectangular or other configurations so as to more easily serve the intended purpose when utilizing a particular brand or type of light 26.

Figure 6A:
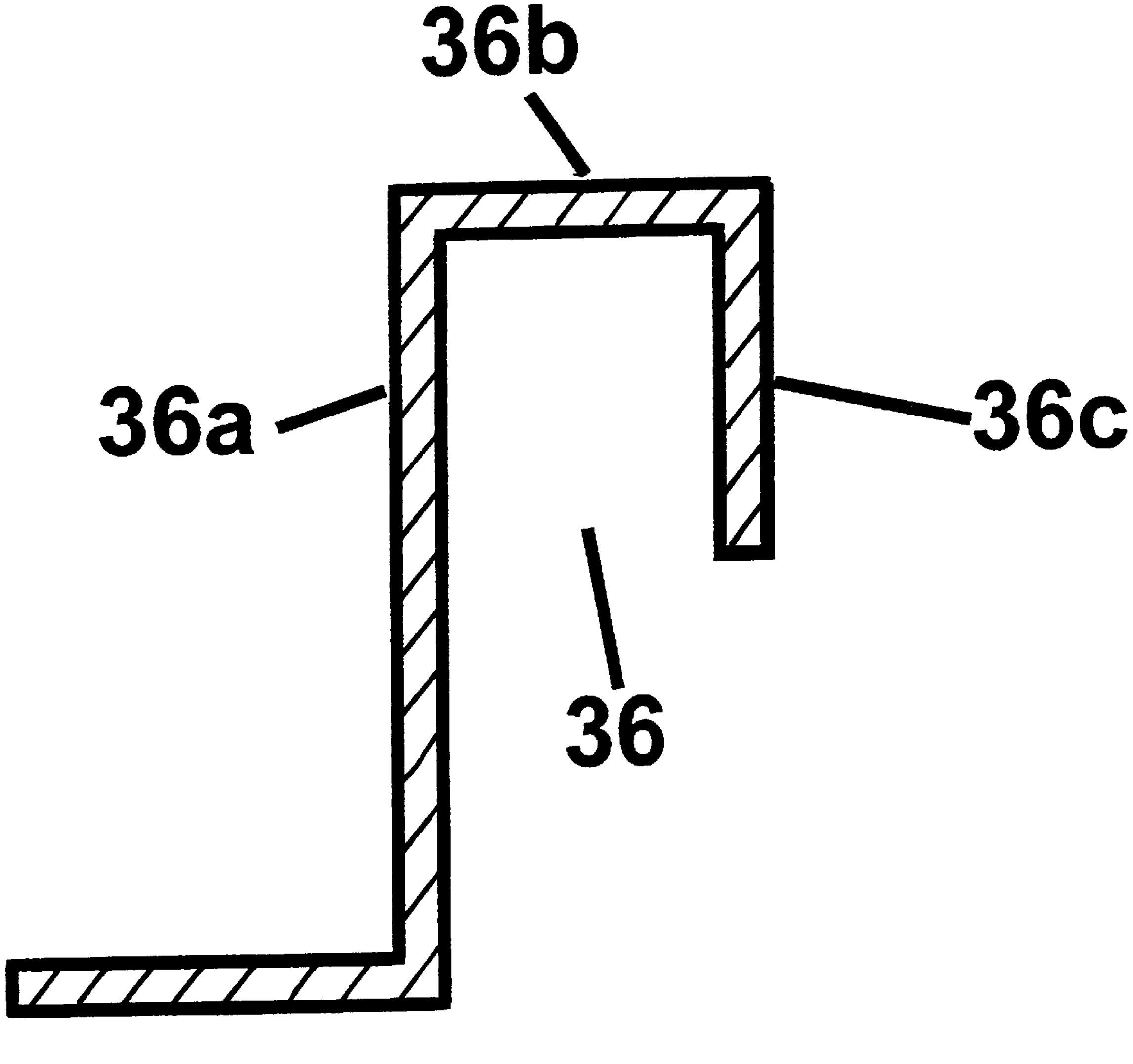
FIG. 6A is a cross-sectional view of FIG. 3 along lines 6A—6A, illustrating the cross-sectional configuration of the attachment portion as constituting a square cross-sectional configuration for press-fitting over the square ends of the opposing side frame members of the creeper.
Figure 6B:
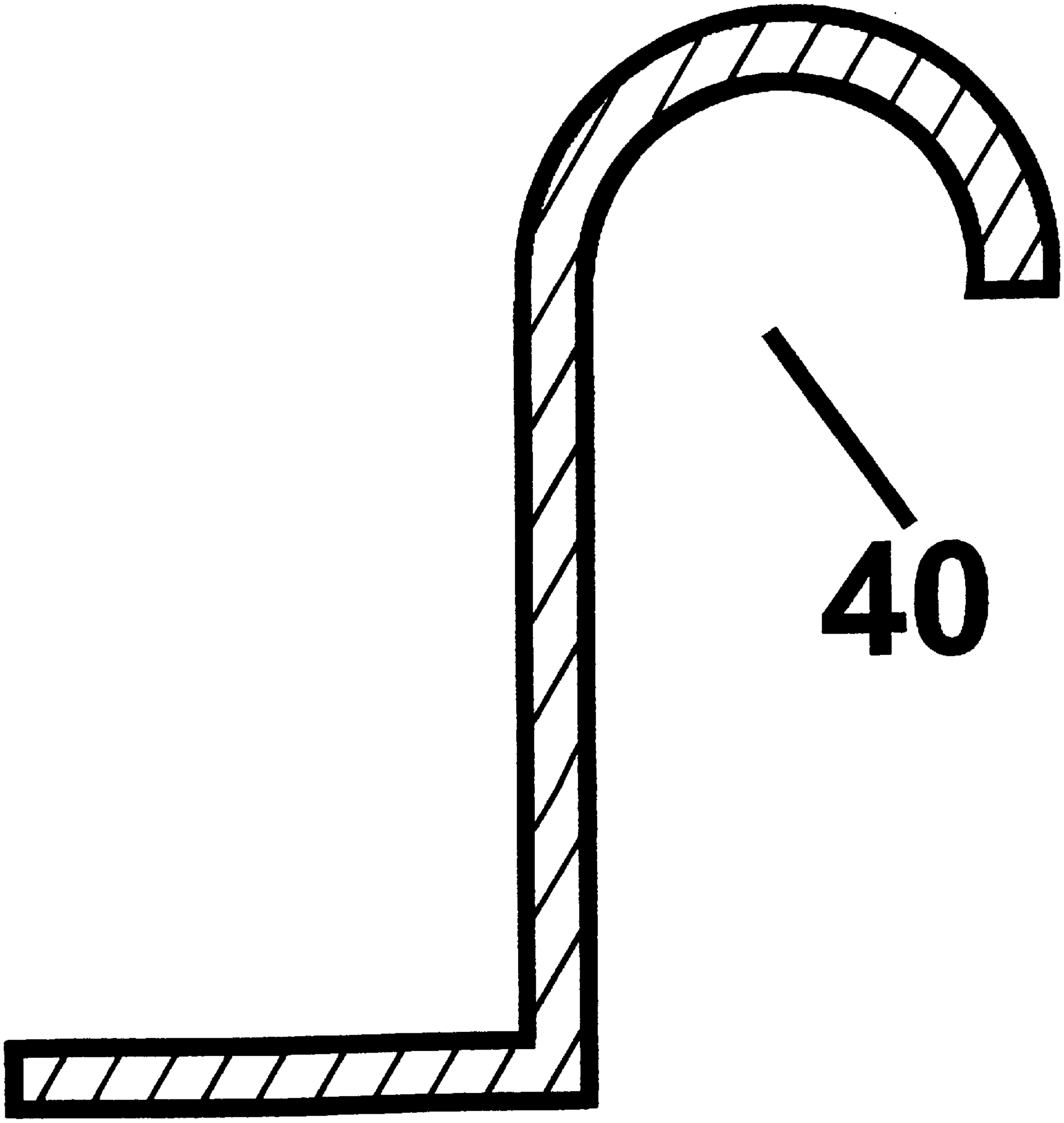
FIG. 6B is a cross-sectional view of the attachment portion similar to FIG. 6A, wherein the attachment portion includes a generally circular cross-sectional configuration for use in connection with prior art mechanics creepers composed of round side frame members.

Referring now to FIGS. 6A and 6B, as noted above, the attachment portion 30 of the light brackets 24 serves to snap-fit onto the frame member 22 of the assembly 20 to one of the side members 12A or 12B of the creeper 12. As shown in FIG. 6A, the attachment portion 30 may comprise a generally square cross-sectional configuration 36 composed of sides 36*a*, 36*b* and 36*c* which define a configuration for snapping onto a corresponding frame member 22 or side member 12A or 12B that is also square 38 in cross-section. Correspondingly, FIG. 6B illustrates the attachment portion 30 of the light bracket 24 as including a generally semicircular cross-sectional configuration 40 that is dimensioned to snap fit over the frame member 22 or side member 12A or 12B that comprises a generally circular cylindrical configuration. Without departing from the spirit and scope of this invention, it is noted that the attachment portion 30 may comprise many other configurations that respectively correspond to the cross-sectional configuration of the frame member 22 of the bracket assembly 20 or of the side member 12A or 12B of the creeper 12. Hence, the attachment portion 30 is not necessarily limited to the square or circular configurations as shown in FIGS. 6A and 6B.

Referring now to FIGS. 7–9, as noted above, the ends 23 of the frame member 22 are configured to interconnect with the ends 28 of the side members 12A and 12B. This interconnection depends, of course, on the cross-sectional configuration of such ends 28 of the side members 12A and 12B of the creeper 10. FIGS. 7–9 illustrate some of the various interconnection means 42 that come within the spirit and scope of this invention.

Figure 7A:
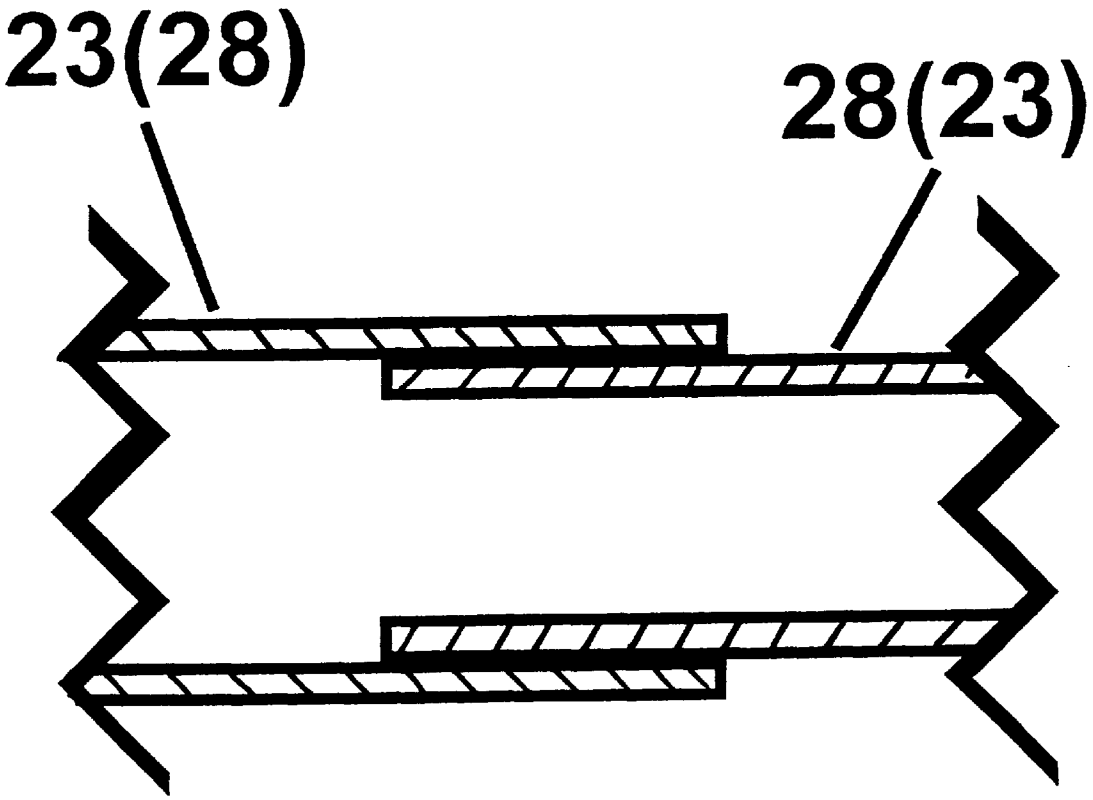
FIG. 7A is a partial longitudinal cross-sectional configuration of the ends of the frame member showing the press-fitting connection thereof onto the ends of the side of the frame members of the mechanics creeper.
Figure 7B:
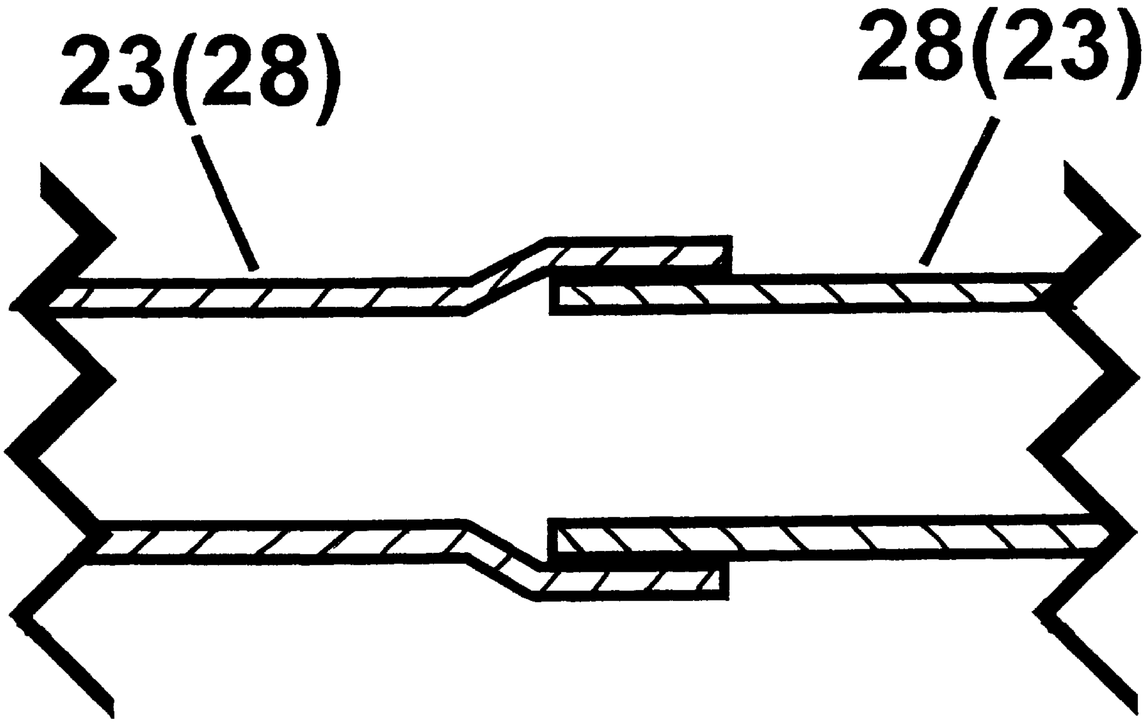
FIG. 7B is a longitudinal cross-sectional configuration of the ends of the frame member showing the press-fitting connection thereof onto the ends of the side of the frame member of the mechanics creeper, wherein the end of the frame member is flared so as to accommodate a square frame member of an increased diameter.

More particularly, as shown in FIG. 7A, the interconnection means 42 may comprise simply configuring one of the members 23 or 28 to be tubular so as to press-fit over the other end (28, 23, respectively). As shown in FIG. 7B, one of the ends (23 or 28) may be flared to an increased diameter so as to press-fit over the other end (28 or 23).

Figure 8A:
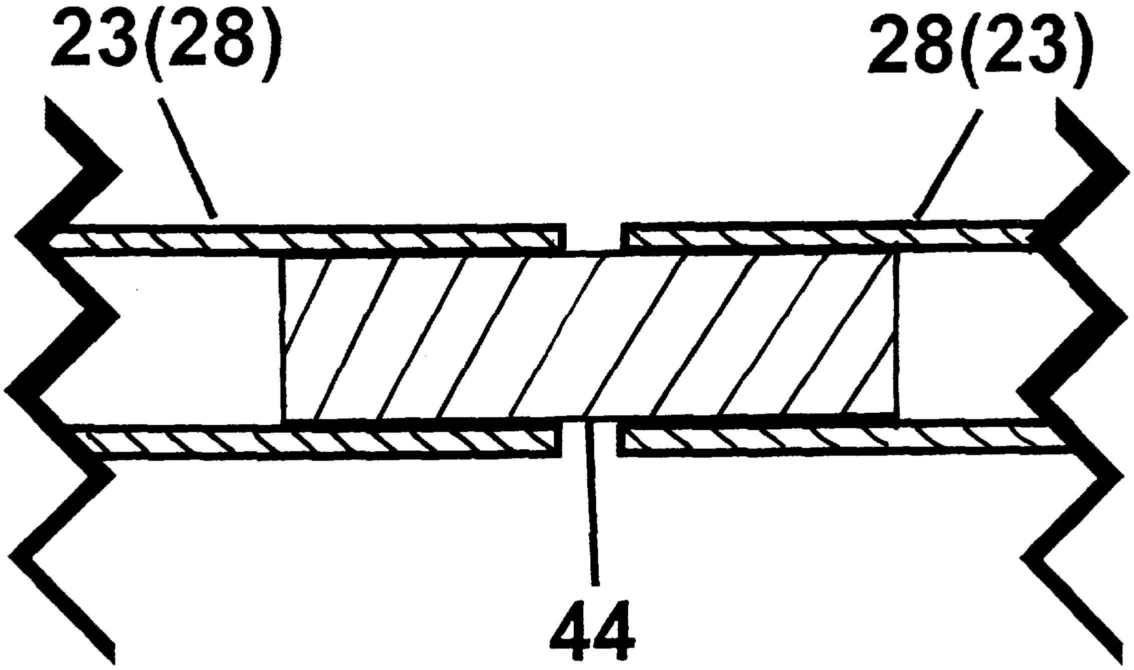
FIG. 8A is a longitudinal cross-sectional configuration of the frame member of the light bracket assembly connected to the end of the side frame member of the mechanics creeper through the use of an adapter plug that is press-fitted into the respective ends of the frame members.
Figure 8B:
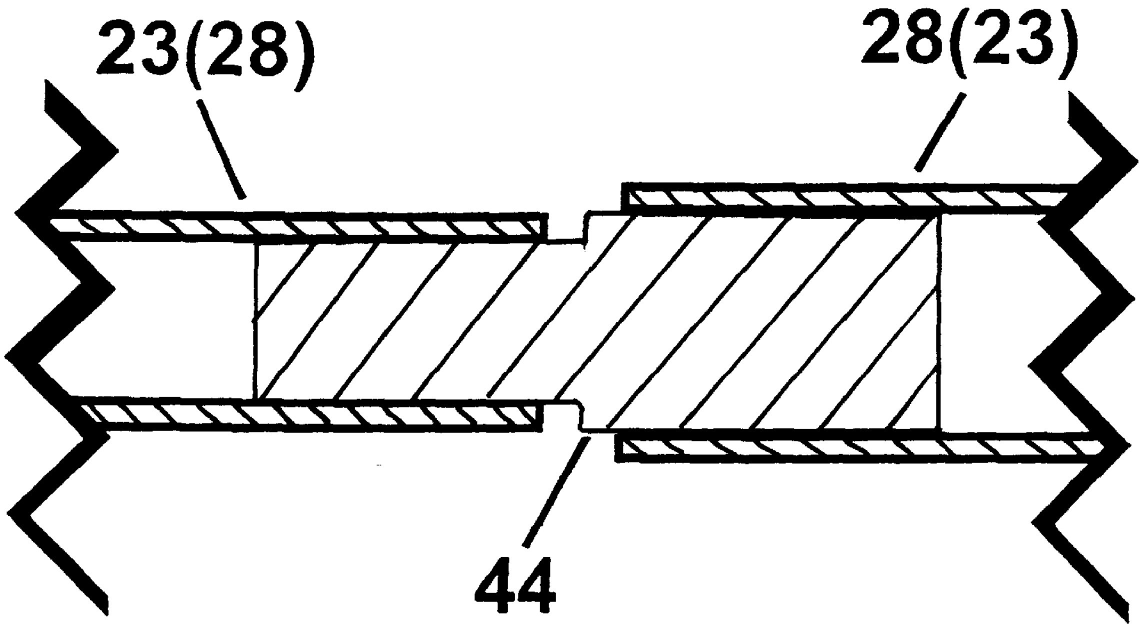
FIG. 8B is a similar cross-sectional configuration to that of FIG. 8A, illustrating the adapter plug having different diameters for interconnecting frame members of different diameters.

Alternatively, as shown in FIG. 8A, the interconnection means 42 may comprise an adapter plug 44 that interconnects the respective tubular ends (23 and 28). As shown in FIG. 8B, the adapter plug 44 may be comprised of different diameters so as to correspondingly fit the respective ends 23 and 28.

Figure 9A:
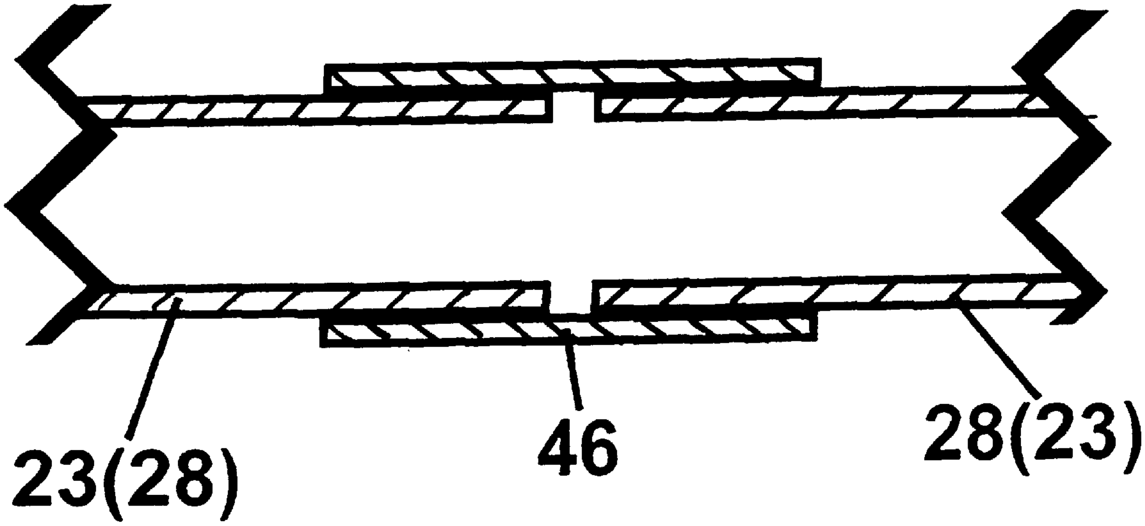
FIG. 9A is a longitudinal cross-sectional configuration of the frame member of the light bracket assembly connected to the end of the side frame member of the mechanics creeper through the use of an adapter sleeve that is press-fitted onto the respective ends of the frame members.
Figure 9B:
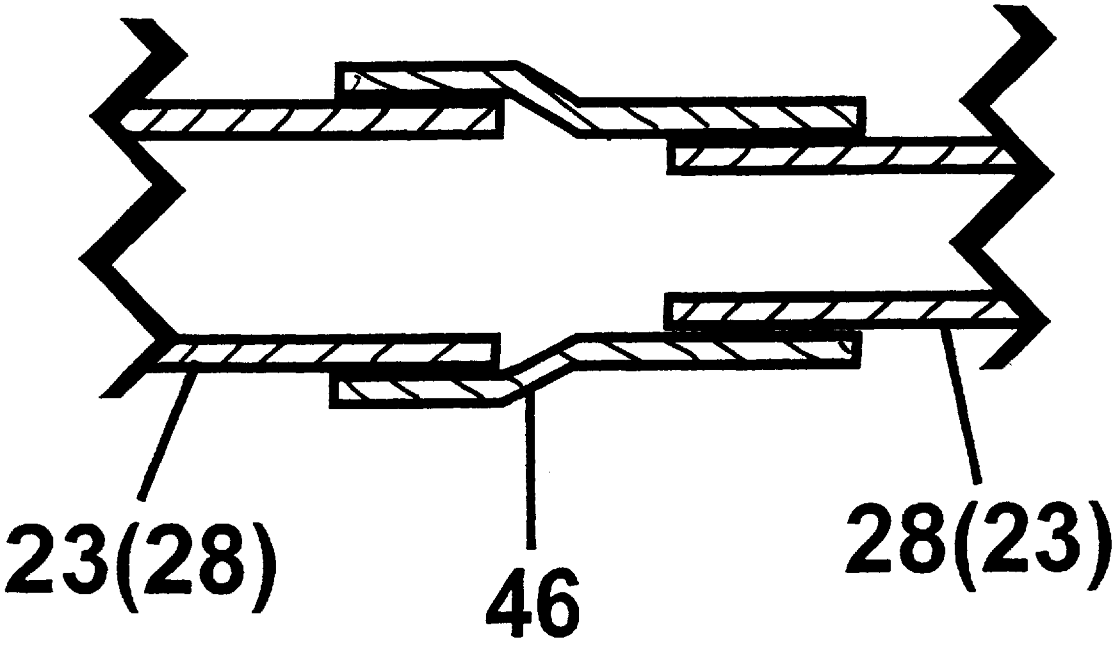
FIG. 9B is a similar cross-sectional configuration to that of FIG. 9A, illustrating the adapter sleeve having different diameters for interconnecting frame members of different diameters.

Finally, as shown in FIGS. 9A and 9B, instead of the adapter plug 44, the interconnection means 42 may comprise an adapter sleeve 46 whose inner diameter of its lumen is dimensioned to be press-fitted onto the respective ends (23 or 28). As shown in FIG. 9B, the diameter of the lumen of the adapter sleeve 46 may comprise different diameters so as to accommodate pins 23 or 28 of different diameters. As shown in FIG. 9C, the adapter sleeve 46 may be combined with the adapter plug 44 to form the interconnection means 42.

Finally, it is noted that without departing from the spirit and scope of this invention, the interconnection means 42 may further comprise fasteners such as screws and bolts, weld joints, or even integral formation of the frame member 22 as an integral component of one or both of the side members 12A and 12B of the creeper 10. Thus, it should be understood that the interconnection means 42 is not limited to the precise embodiments illustrated in FIGS. 7–9.

The present disclosure includes that contained in the appended claims, as well as that of the foregoing description. Although this invention has been described in its preferred form with a certain degree of particularity, it is understood that the present disclosure of the preferred from has been made only by way of example and that numerous changes in the details of construction and the combination and arrangement of parts may be resorted to without departing from the spirit and scope of the invention.

Now that the invention has been described,

What is claimed is:

1. A light bracket assembly for connection to a mechanics creeper, the mechanics creeper having opposing side members between which is positioned a bed and a headrest, the light bracket assembly comprising in combination:

a frame member having ends;

means for interconnecting said ends of said frame member to the side members of the creeper, respectively; and at least one light bracket, each said light bracket comprising an attachment portion for attachment to said frame member and a cradle portion for cradling a mechanic's light, whereby a mechanic's light may be cradled within said cradle portion of said light bracket for illuminating a work area.

2. A light bracket assembly as set forth in claim 1, wherein said cradle portion comprises a non-semi-circular cross-sectional configuration.

3. The light bracket assembly as set forth in claim 2, wherein said non-semi-circular cross-sectional configuration comprises a generally V-shaped configuration.

4. The light bracket assembly as set forth in claim 1, wherein said attachment portion comprises a cross-sectional configuration corresponding to a cross-sectional configuration of said frame member so as to be attached thereto.

5. The light bracket assembly as set forth in claim 1, wherein said attachment portion snap-fits onto said frame member.

6. The light bracket assembly as set forth in claim 4, wherein the cross-sectional configuration of said frame member comprises a square and the cross-sectional configuration of said attachment portion comprises a square.

7. The light bracket assembly as set forth in claim 4, wherein the cross-sectional configuration of said frame member comprises a circular configuration and the cross-sectional configuration of said attachment portion comprises a circular configuration.

8. The light bracket assembly as set forth in claim 1, further including at least two of said light brackets, said light brackets being attached to opposing sides of said frame member in facing relationship with each other.

9. The light bracket assembly as set forth in claim 1, wherein said interconnection means comprises press-fitting said ends of said frame member relative to ends of said side members of the creeper.

10. The light bracket assembly as set forth in claim 1, wherein said interconnection means comprises an adapter plug for interconnecting said ends of said frame members with ends of said side members of the creeper.

11. The light bracket assembly as set forth in claim 1, wherein said interconnection means comprises an adapter sleeve for interconnecting said ends of said frame members with ends of said side members of the creeper.

12. A light bracket for connection to a mechanics creeper having opposing side frame members between which is positioned a bed and a headrest, comprising at least one light bracket, said light bracket comprising an attachment portion for attachment to one of said opposing side frame members and a cradle portion for cradling a mechanic's light, whereby a mechanic's light may be cradled within said cradle portion of said light bracket for illuminating a work area.

13. A light bracket assembly as set forth in claim 12, wherein said cradle portion comprises a non-semi-circular cross-sectional configuration.

14. The light bracket assembly as set forth in claim 13, wherein said non-semi-circular cross-sectional configuration comprises a generally V-shaped configuration.

15. The light bracket assembly as set forth in claim 12, wherein said attachment portion comprises a cross-sectional configuration corresponding to a cross-sectional configuration of said frame member so as to be attached thereto.

16. The light bracket assembly as set forth in claim 12, wherein said attachment portion snap-fits onto said frame portion.

17. The light bracket assembly as set forth in claim 12, further including at least two of said light brackets, said light brackets being attached to said frame member in facing relationship with each other.

* * * * *